United States Patent
Kitamura et al.

(10) Patent No.: US 10,907,649 B2
(45) Date of Patent: Feb. 2, 2021

(54) TURBINE HOUSING, EXHAUST TURBINE, AND TURBOCHARGER

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Toyotaka Yoshida, Tokyo (JP); Toru Hoshi, Tokyo (JP); Motoki Ebisu, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 56 days.

(21) Appl. No.: 16/311,406

(22) PCT Filed: Dec. 16, 2016

(86) PCT No.: PCT/JP2016/087598
§ 371 (c)(1),
(2) Date: Dec. 19, 2018

(87) PCT Pub. No.: WO2018/109933
PCT Pub. Date: Jun. 21, 2018

(65) Prior Publication Data
US 2019/0234422 A1 Aug. 1, 2019

(51) Int. Cl.
*F04D 29/42* (2006.01)
*F02B 39/00* (2006.01)

(52) U.S. Cl.
CPC .......... *F04D 29/4206* (2013.01); *F02B 39/00* (2013.01); *F05D 2240/14* (2013.01)

(58) Field of Classification Search
CPC .. F02B 37/18; F04D 29/5853; F04D 29/4286; F01D 25/26; F01D 25/14; F01D 25/145; F01D 25/265
See application file for complete search history.

(56) References Cited

U.S. PATENT DOCUMENTS

| | | | | |
|---|---|---|---|---|
| 3,806,275 A | * | 4/1974 | Aspinwall | F01D 5/189 416/97 R |
| 5,406,795 A | * | 4/1995 | Raub | F01D 9/026 415/213.1 |

(Continued)

FOREIGN PATENT DOCUMENTS

| CN | 102575576 A | 7/2012 |
|---|---|---|
| CN | 105593475 A | 5/2016 |

(Continued)

OTHER PUBLICATIONS

International Preliminary Report on Patentability and Written Opinion of the International Searching Authority, dated Jun. 27, 2019, for International Application No. PCT/JP2016/087598, with an English translation of the Written Opinion.

(Continued)

*Primary Examiner* — Richard A Edgar
(74) *Attorney, Agent, or Firm* — Birch, Stewart, Kolasch & Birch, LLP

(57) ABSTRACT

A turbine housing includes: a housing body which is configured to accommodate a turbine wheel and which includes an inlet section forming an inlet flow passage for guiding exhaust gas to the turbine wheel, and an outlet section forming an outlet flow passage for discharging the exhaust gas from the turbine wheel; and at least one sleeve disposed along an inner wall surface of at least one of the inlet section or the outlet section of the housing body. The at least one sleeve includes a plurality of sections divided along a flow direction of the exhaust gas.

12 Claims, 8 Drawing Sheets

(56) References Cited

U.S. PATENT DOCUMENTS

| | | | |
|---|---|---|---|
| 7,074,009 B2* | 7/2006 | Allmang | F01D 9/026 |
| | | | 415/177 |
| 9,097,121 B2* | 8/2015 | Joergl | F01D 9/026 |
| 9,841,033 B2* | 12/2017 | Henke | F04D 29/582 |
| 2011/0120124 A1 | 5/2011 | Czerwinski et al. | |
| 2012/0201655 A1 | 8/2012 | Kusakabe et al. | |
| 2015/0337858 A1 | 11/2015 | Joergl et al. | |
| 2015/0361873 A1 | 12/2015 | Matsui | |
| 2016/0115823 A1 | 4/2016 | Henke et al. | |
| 2017/0350277 A1* | 12/2017 | Kraemer | F01D 9/06 |

FOREIGN PATENT DOCUMENTS

| | | |
|---|---|---|
| DE | 103 07 028 B3 | 5/2004 |
| DE | 10 2009 054 403 A1 | 6/2011 |
| JP | 2006-161574 A | 6/2006 |
| JP | 2015-1183 A | 1/2015 |
| JP | 2016-3573 A | 1/2016 |
| JP | 2016-75287 A | 5/2016 |
| WO | WO 2011/053513 A2 | 5/2011 |
| WO | WO 2012/127531 A1 | 9/2012 |

OTHER PUBLICATIONS

International Search Report, dated Feb. 28, 2017, for International Application No. PCT/JP2016/087598, with an English translation.

Japanese Office Action, dated Jan. 22, 2019, for Japanese Application No. 2018-528072, with an English machine translation.

Extended European Search Report dated Nov. 15, 2019 issued to the corresponding European Application No. 16924200.5.

Office Action (Decision of Refusal) dated Sep. 3, 2019 issued in the corresponding Japanese Application No. 2018-528072.

Office Action dated Jun. 9, 2020 issued in counterpart Chinese Application No. 201680087157.X.

Office Action dated Jun. 3, 2020 issued in counterpart European Patent Application No. 16924200.5.

* cited by examiner

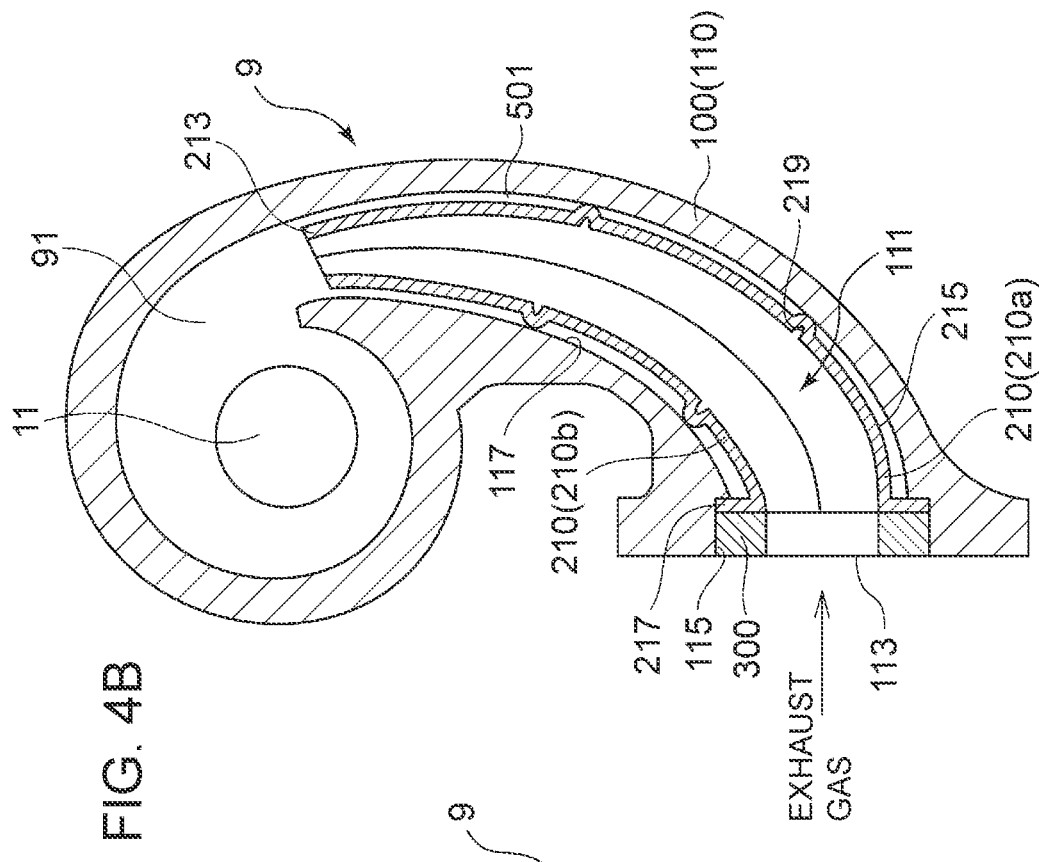
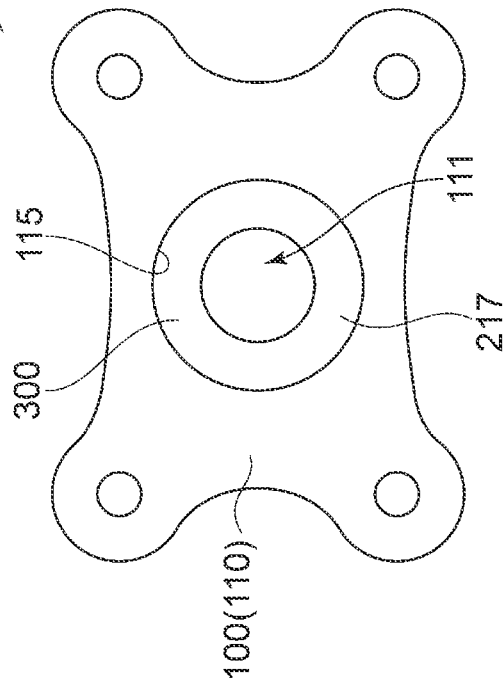
FIG. 4A
FIG. 4B (a)

(b)

EXHAUST GAS

TURBINE HOUSING, EXHAUST TURBINE, AND TURBOCHARGER

TECHNICAL FIELD

The present disclosure relates to a turbine housing for an exhaust turbine, an exhaust turbine, and a turbocharger.

BACKGROUND ART

A known exhaust turbine is driven by utilizing energy of exhaust gas discharged from an engine (internal combustion engine), for instance. An exhaust turbine includes a turbine housing which accommodates a turbine wheel. The turbine housing has a high thermal capacity, and thus may take thermal energy away from high-temperature exhaust gas and cause thermal loss, upon contact with the exhaust gas.

Thus, in Patent Document 1, a sleeve is mounted to an inlet region and an outlet region of the turbine housing, to reduce the area of direct contact between exhaust gas and an inner wall surface of the turbine housing.

CITATION LIST

Patent Literature

Patent Document 1: JP2016-75287A

SUMMARY

Problems to be Solved

However, in Patent Document 1, the sleeve mounted to the turbine housing has an integrated structure. It is difficult to machine such a sleeve into a shape suitable for the inlet section or the outlet section of the turbine housing.

In view of the above, an object of some embodiments according to the present invention is to provide a turbine housing, an exhaust turbine, and a turbocharger, which have an improved manufacturability and which suppress loss of thermal energy of exhaust gas.

Solution to the Problems (1) A turbine housing according to some embodiments of the present invention includes: a housing body which is configured to accommodate a turbine wheel and which includes an inlet section forming an inlet flow passage for guiding exhaust gas to the turbine wheel, and an outlet section forming an outlet flow passage for discharging the exhaust gas from the turbine wheel; and at least one sleeve disposed along an inner wall surface of at least one of the inlet section or the outlet section of the housing body. The at least one sleeve includes a plurality of sections divided along a flow direction of the exhaust gas.

With the above configuration (1), the sleeve is disposed along the inner wall surface of at least one of the inlet section or the outlet section of the housing body, and thus it is possible to prevent contact between exhaust gas and the inner wall surface of at least one of the inlet section or the outlet section of the housing body. Accordingly, it is possible to suppress thermal energy loss of exhaust gas. Further, each sleeve includes a plurality of sections divided along the flow direction of exhaust gas, and thus it merely needs to machine the sleeve by sections to produce the sleeve, and the manufacturability is improved compared to a turbine housing that includes a sleeve having an integrated structure.

(2) In an illustrative embodiment, in the above configuration (1), the housing body includes a concave portion disposed along a peripheral edge of an opening end of a flow passage of the exhaust gas of at least one of the inlet section or the outlet section of the housing body, and the at least one sleeve includes a convex portion disposed projecting outward in a radial direction of the sleeve so as to be engaged with the concave portion.

With the above configuration (2), the concave portion disposed along the peripheral edge of the flow passage of exhaust gas of at least one of the inlet section or the outlet section of the housing body is engaged with the convex portion disposed projecting outward in the radial direction of the sleeve, and thus it is possible to determine the position of the sleeve relative to the housing body. In this way, it is possible to assemble the sleeve with the housing body easily, and the manufacturability of the turbine housing is improved.

(3) In an illustrative embodiment, in the above configuration (2), the turbine housing further includes a fixation piece for fixing the sleeve on the housing body, and the convex portion of the sleeve is held between the fixation piece and the housing body while being engaged with the concave portion of the housing body.

With the above configuration (3), the fixation piece for fixing the sleeve to the housing body is provided, and the convex portion of the sleeve is held between the fixation piece and the housing body, while being engaged with the concave portion of the housing body. Accordingly, it is possible to fix the sleeve to the housing body more securely.

(4) In an illustrative embodiment, in any one of the above configurations (1) to (3), the at least one sleeve is supported by the housing body such that a gap is formed between an outer surface of the sleeve and an inner wall surface of the housing body.

With the above configuration (4), the at least one sleeve is supported on the housing body, such that a gap is formed between the outer surface of the sleeve and the inner wall surface of the housing body. Thus, it is possible to suppress heat input to the turbine housing from exhaust gas with the gap between the outer surface of the sleeve and the inner wall surface of the housing body, and to suppress loss of thermal energy of exhaust gas.

(5) In an illustrative embodiment, in any one of the above configurations (1) to (4), the at least one sleeve includes a protruding portion disposed protruding from an outer surface of the sleeve, in a region between an upstream end portion and a downstream end portion with respect to the exhaust gas, and the protruding portion is configured to form a gap between the outer surface of the sleeve and an inner wall surface of the housing body.

With the above configuration (5), the at least one sleeve includes the protruding portion disposed to protrude from the outer surface of the sleeve, in a region between the upstream end portion and the downstream end portion with respect to exhaust gas, and the protruding portion forms the gap between the outer surface of the sleeve and the inner wall surface of the housing body. Thus, it is possible to maintain the gap more reliably between the outer surface of the sleeve and the inner wall surface of the housing body. Thus, it is possible to suppress heat input to the turbine housing from exhaust gas, and to suppress loss of thermal energy of exhaust gas even further.

(6) In an illustrative embodiment, in the above configuration (5), the protruding portion is formed by a dimple disposed so as to be recessed toward the outer surface from an inner surface of the sleeve.

With the above configuration (6), the protruding portion is formed by a dimple disposed so as to be recessed from the inner surface the outer surface of the sleeve, and thus it is possible to form the protruding portion simultaneously when machining the sleeve by pressing or the like. Thus, it is possible to improve the manufacturability of the turbine housing.

(7) In an illustrative embodiment, in any one of the above configurations (1) to (6), at least one of the inlet section or the outlet section of the housing body includes a fitting groove into which a turbine-wheel side end portion of the sleeve is engageable.

With the above configuration (7), at least one of the inlet section or the outlet section of the housing body includes a fitting groove configured to be engaged with the turbine-wheel side end portion of the sleeve. Thus, with the turbine-wheel side end portion of the sleeve being engaged with the fitting groove, it is possible to determine the position of the sleeve relative to the housing body accurately. Thus, it is possible to improve the manufacturability of the turbine housing.

For instance, in a case where a gap is formed between the outer surface of the sleeve and the inner wall surface of the housing body, it is possible to maintain the gap more reliably between the outer surface of the sleeve and the inner wall surface of the housing body. Thus, it is possible to suppress heat input to the turbine housing from exhaust gas, and to suppress loss of thermal energy of exhaust gas even further.

(8) In an illustrative embodiment, in any one of the above configurations (1) to (7), the turbine housing further includes a fastening member for fastening a turbine-wheel side end portion of the sleeve to at least one of the inlet section or the outlet section of the housing body.

With the above configuration (8), at least one of the inlet section or the outlet section of the housing body includes a fastening member for fastening the turbine-wheel side end portion of the sleeve. Thus, the turbine-wheel side end portion of the sleeve is fastened to the housing body with the fastening member. Thus, it is possible to determine the position of the sleeve relative to the housing body, and improve the manufacturability of the turbine housing.

For instance, in a case where a gap is formed between the outer surface of the sleeve and the inner wall surface of the housing body, it is possible to maintain the gap more reliably between the outer surface of the sleeve and the inner wall surface of the housing body. Thus, it is possible to suppress heat input to the turbine housing from exhaust gas, and to suppress loss of thermal energy of exhaust gas even further.

(9) In an illustrative embodiment, in any one of the above configurations (1) to (8), the turbine housing further includes a thermal barrier coating on an inner surface of the sleeve.

With the above configuration (9), the thermal barrier coating is disposed on the inner surface of the sleeve, and thus it is possible to suppress heat input to the turbine housing from exhaust gas, and to suppress loss of thermal energy of exhaust gas even further.

(10) In an illustrative embodiment, in any one of the above configurations (1) to (9), the turbine housing further includes a heat insulating material disposed between the sleeve and an inner wall surface of at least one of the inlet section or the outlet section of the housing body.

With the above configuration (10), a heat insulating member is disposed between the sleeve and the inner wall surface of at least one of the inlet section or the outlet section of the housing body. Thus, it is possible to suppress heat input to the turbine housing from exhaust gas, and to suppress loss of thermal energy of exhaust gas even further.

(11) An exhaust turbine according to some embodiments of the present invention includes: the turbine housing according to any one of the above (1) to (10); and a turbine wheel to be accommodated in the turbine housing.

According to the above configuration (11), the turbine housing according to any one of the above (1) to (10) is provided. Thus, it is possible to prevent contact between exhaust gas and the inner wall surface of at least one of the inlet section or the outlet section of the housing body of the turbine housing, and thereby it is possible to suppress thermal energy loss of exhaust gas. Further, the exhaust turbine can be easily produced by machining the sleeve by each section.

(12) A turbocharger according to some embodiments of the present invention includes: the exhaust turbine according to the above (11); and a compressor configured to be driven by the exhaust turbine.

According to the above configuration (12), the above exhaust turbine (11) is provided. Thus, it is possible to prevent contact between exhaust gas and the inner wall surface of at least one of the inlet section or the outlet section of the housing body of the turbine housing, and thereby it is possible to suppress thermal energy loss of exhaust gas. Further, the turbocharger can be easily produced by machining the sleeve by each section.

Advantageous Effects

According to some embodiments of the present invention, by providing the sleeve, it is possible to prevent contact between exhaust gas and the inner wall surface of at least one of the inlet section or the outlet section of the housing body of the turbine housing, and thereby it is possible to suppress thermal energy loss of exhaust gas. Further, for the sleeve can be machined by each section, the manufacturability of a turbine housing with a sleeve is improved.

BRIEF DESCRIPTION OF DRAWINGS

FIG. 4 is a diagram showing a modified example of an exhaust gas inlet section of a turbine housing according to some embodiments of the present invention.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function. On the other hand, an expression such as "comprise", "include", "have", "contain" and "constitute" are not intended to be exclusive of other components.

Figure 1:
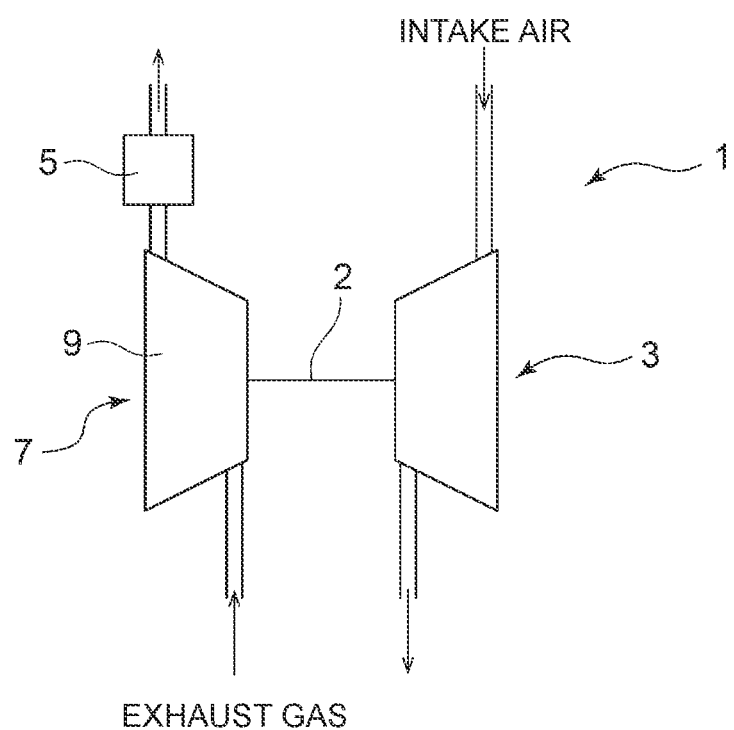
FIG. 1 is a conceptual configuration diagram of a turbocharger according to some embodiments of the present invention.
Figure 2:
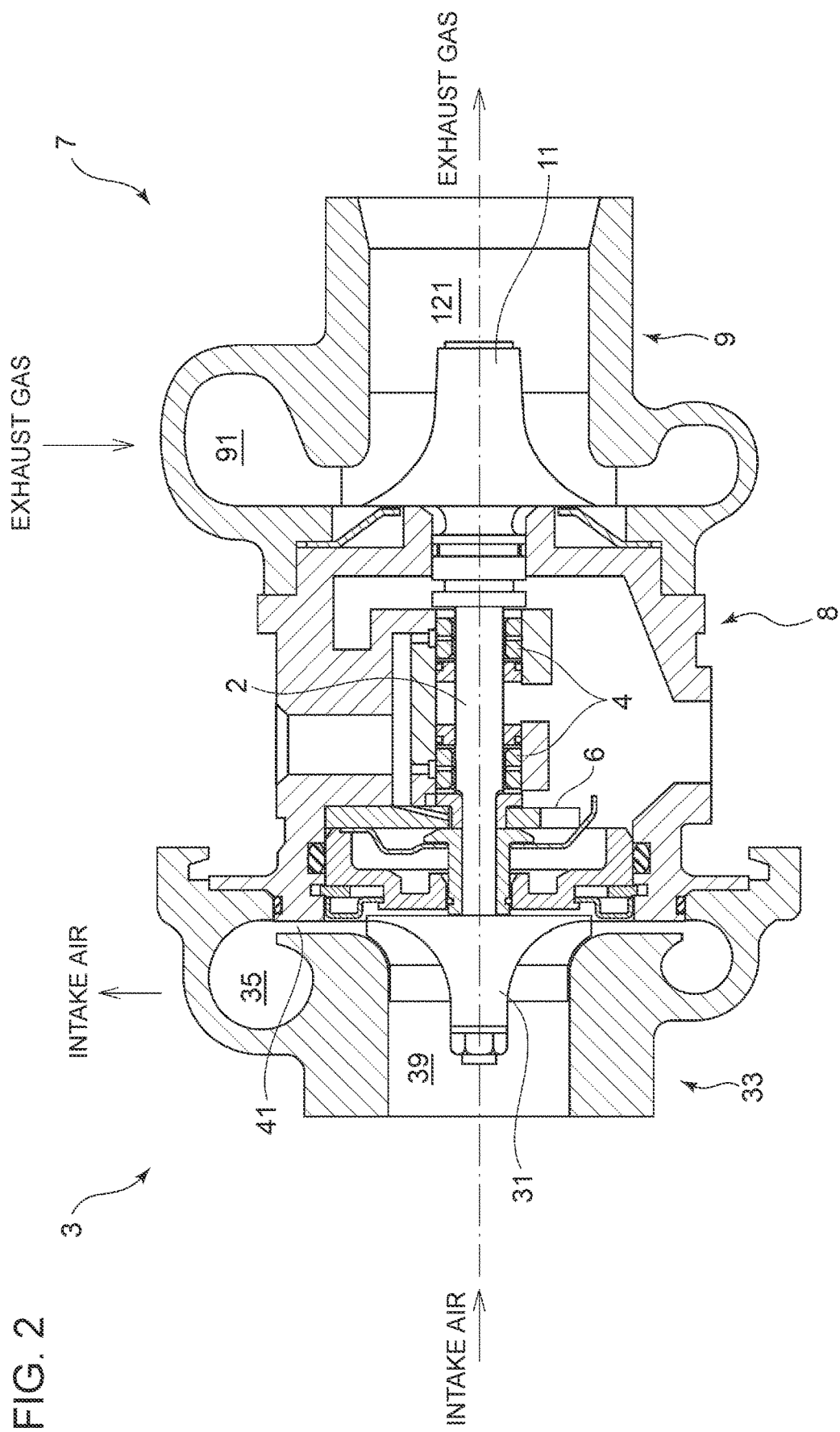
FIG. 2 is a cross-sectional view of a configuration of a turbocharger according to some embodiments of the present invention.

FIG. 1 is a schematic configuration diagram of a turbocharger, which is an example of an application of an exhaust turbine according to some embodiments of the present invention. FIG. 2 is a diagram showing an example of a specific configuration of the turbocharger in FIG. 1. In some embodiments, the turbocharger is a turbocharger mounted to engines for automobiles, for instance.

As shown in FIG. 1, the turbocharger 1 includes a rotational shaft 2, an exhaust turbine 7 disposed on one end side of the rotational shaft 2, and a compressor 3 disposed on the other end side of the rotational shaft 2. The exhaust turbine 7 is rotary driven by exhaust gas from an engine or the like, and thereby rotates the rotational shaft 2. The compressor 3 is rotary driven in accordance with rotation of the rotational shaft 2, and compresses gas or the like to be supplied to the engine or the like.

In some embodiments, a catalyst 5 for purifying harmful components in exhaust gas may be disposed on the downstream side of the exhaust turbine 7 with respect to the flow direction of exhaust gas.

More specifically, as shown in FIG. 2, the exhaust turbine 7 of the turbocharger 1 includes a turbine wheel 11 coupled to an end side of the rotational shaft 2, and a turbine housing 9 that accommodates the turbine wheel 11. A turbine scroll flow passage 91 having a spiral shape is disposed on an outer peripheral part of the turbine housing 9. The turbine wheel 11 is accommodated at the center part of the turbine scroll flow passage 91.

Exhaust gas flows through the turbine scroll flow passage 91 to act on the turbine wheel 11, and then exits the turbine housing 9 through an outlet flow passage 121 which extends along the axial direction of the rotational shaft 2.

Further, the compressor 3 of the turbocharger 1 includes a compressor impeller 31 disposed on the other end side of the rotational shaft 2, and a compressor housing 33 accommodating the compressor impeller 31. A compressor scroll flow passage 35 having a spiral shape is disposed on an outer peripheral part of the compressor housing 33. The compressor impeller 31 is accommodated in the center part of the compressor scroll flow passage 35.

Intake gas flows through an intake guide flow passage 39 which extends along the axial direction of the rotational shaft 2, is compressed by the compressor impeller 31, and guided into the compressor scroll flow passage 35 via a diffuser flow passage 41 extending orthogonal to the axial direction of the rotational shaft 2, to be supplied to an engine (not depicted).

Further, the turbocharger 1 includes a radial bearing 4 supporting the rotational shaft 2 rotatably, a thrust plate 6 supporting a thrust force (axial directional force) of the rotational shaft 2, and a bearing housing 8 accommodating the radial bearing 4 and the thrust plate 6.

Next, with reference to FIGS. 3 to 6, the turbine housing 9 of the exhaust turbine 7 according to some embodiments of the present invention will now be described.

Figure 3A:
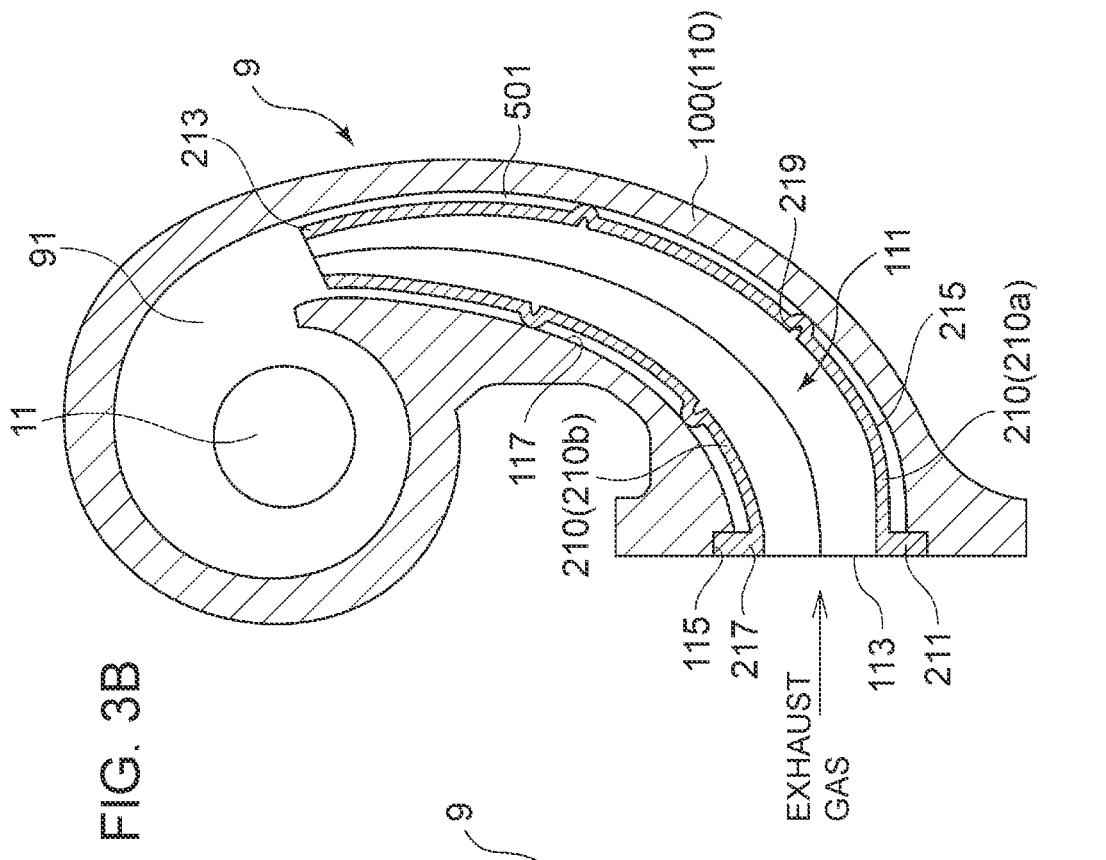
FIG. 3 is a diagram of an example of an exhaust gas inlet section of a turbine housing according to some embodiments of the present invention.
Figure 3B:
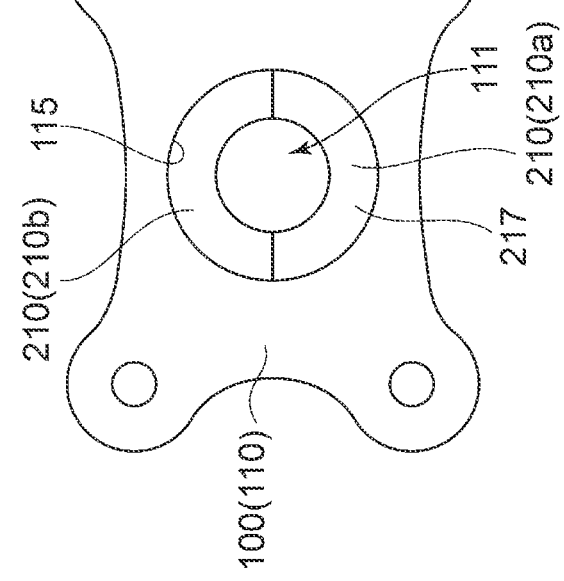

FIG. 3 is a diagram of an example of an exhaust gas inlet section of a turbine housing according to some embodiments of the present invention. Herein, FIG. 3A is a front view of an exhaust gas inlet opening of a turbine housing. FIG. 3B is a cross-sectional view of the exhaust gas inlet section of the turbine housing.

FIG. 4 is a diagram showing a modified example of an exhaust gas inlet section of a turbine housing according to some embodiments of the present invention. Herein, FIG. 4A is a front view of an exhaust gas inlet opening of a turbine housing. FIG. 4B is a cross-sectional view of the exhaust gas inlet section of the turbine housing.

Figure 5A:
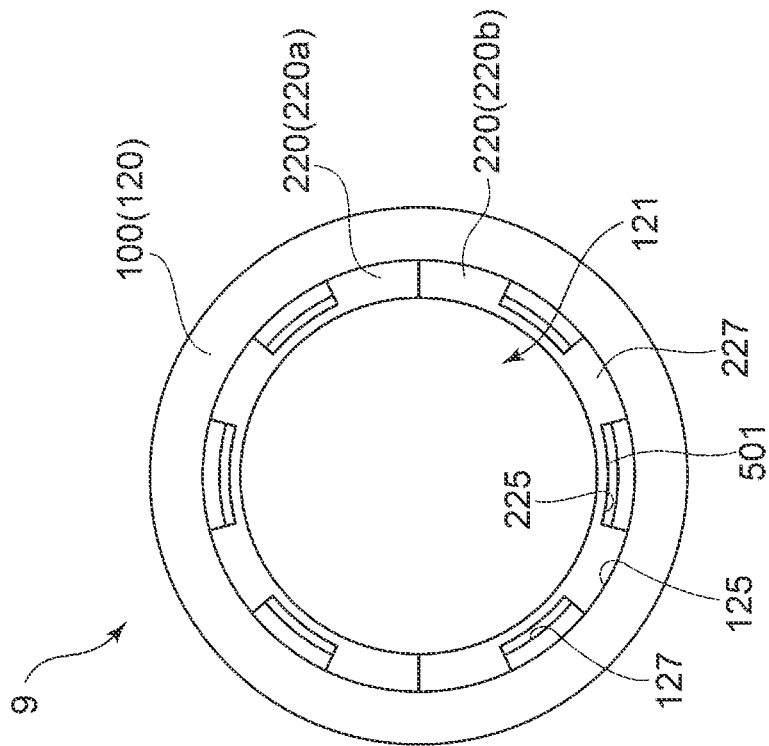
FIG. 5 is a diagram of an example of an exhaust gas outlet section of a turbine housing according to some embodiments of the present invention.
Figure 5B:
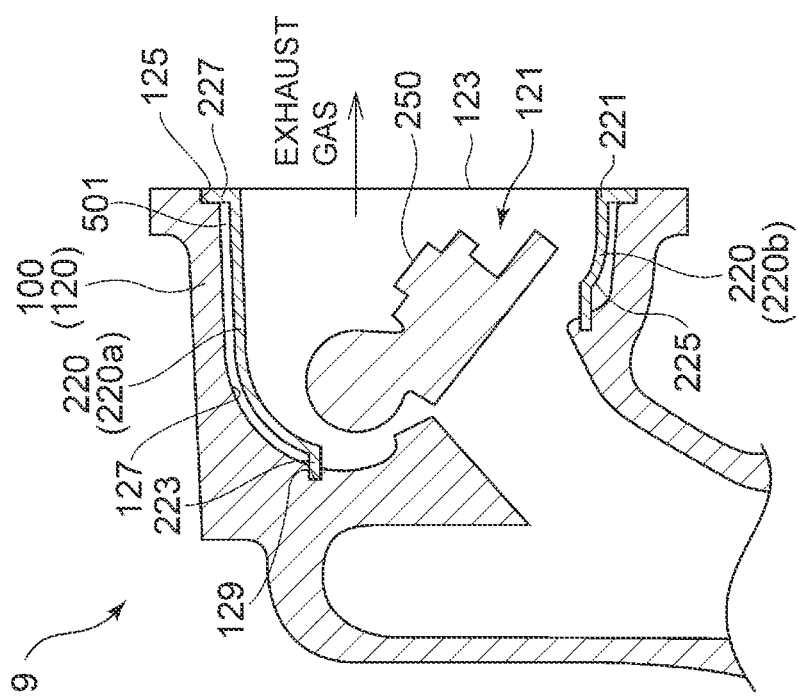

FIG. 5 is a diagram of an example of an exhaust gas outlet section of a turbine housing according to some embodiments of the present invention. Herein, FIG. 5A is a cross-sectional view of an exhaust gas outlet section of a turbine housing. FIG. 5B is a front view of the exhaust gas outlet of the turbine housing.

Figure 6A:
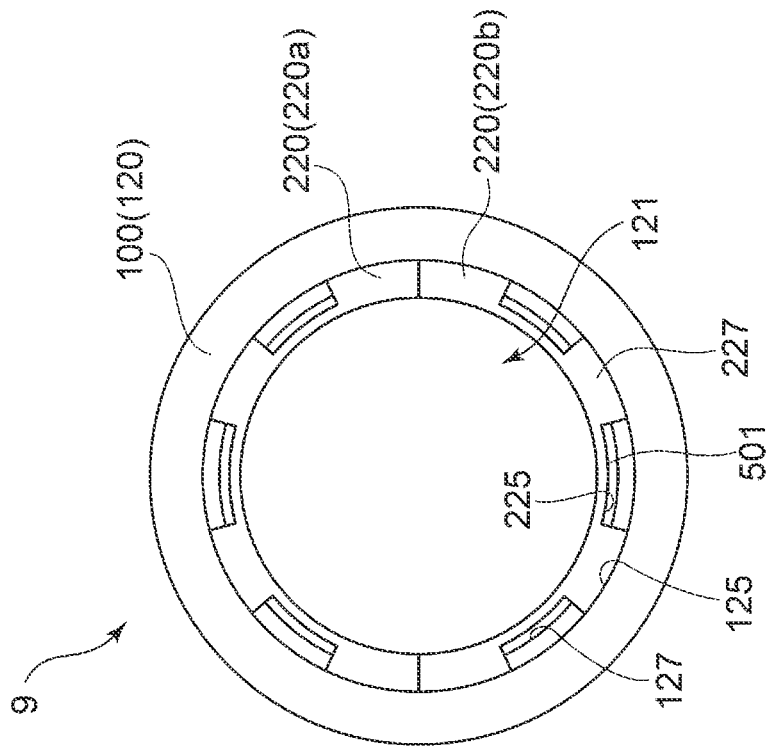
FIG. 6 is a diagram of a modified example of an exhaust gas outlet section of a turbine housing according to some embodiments of the present invention.
Figure 6B:
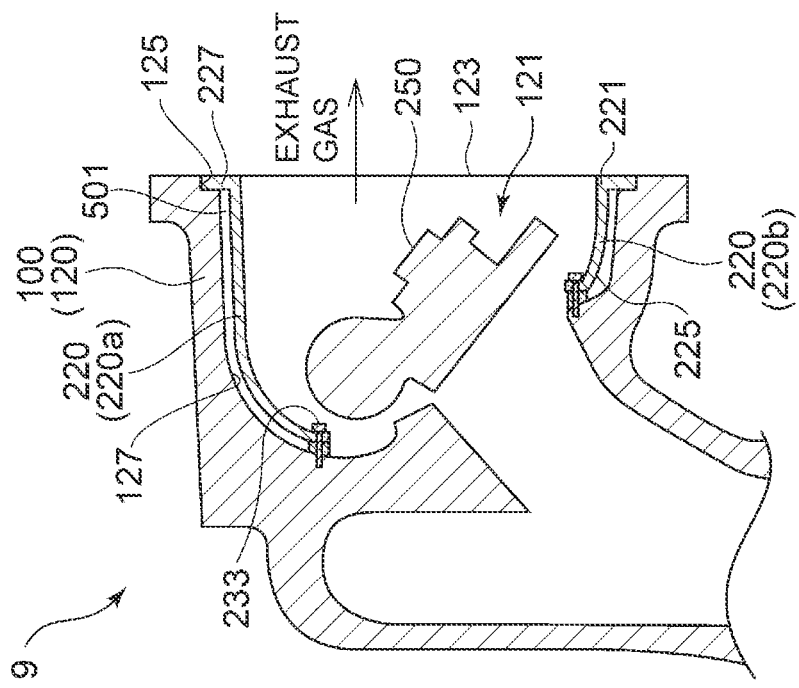

FIG. 6 is a diagram of a modified example of an exhaust gas outlet section of a turbine housing according to some embodiments of the present invention. Herein, FIG. 6A is a cross-sectional view of an exhaust gas outlet section of a turbine housing. FIG. 6B is a front view of the exhaust gas outlet opening of the turbine housing.

In the embodiment described below, as shown in FIGS. 3 to 6, the turbine housing 9 of the exhaust turbine 7 includes a housing body 100, and a sleeve (210, 220) disposed inside the housing body 100. The housing body 100 includes an inlet section 110 shown in FIGS. 3 and 4, and an outlet section 120 shown in FIGS. 5 and 6. The inlet section 110 of the housing body 100 forms an inlet flow passage 111 for guiding exhaust gas to the turbine wheel 11 accommodated in the housing body 100. The outlet section 120 of the housing body 100 forms an outlet flow passage 121 for discharging exhaust gas from the turbine wheel 11 outside the housing body 100.

The inlet sleeve 210 shown in FIGS. 3 and 4 is disposed on the inlet section 110 of the housing body 100. The outlet sleeve 220 shown in FIGS. 5 and 6 are disposed on the outlet section 120 of the housing body 100. The specific configuration of the inlet sleeve 210 and the outlet sleeve 220 will be described below.

In the embodiment described below, the sleeves (210, 220) are provided for both of the inlet section 110 and the outlet section 120 of the housing body 100. Nevertheless, this embodiment is not limitative. In some embodiments, the sleeve may be disposed along the inner wall surface of at least one of the inlet section 110 or the outlet section 120 of the housing body 100.

First, with reference to FIGS. 3 to 4, the specific configuration of the exhaust gas inlet section of the turbine housing 9 will be described. Next, with reference to FIGS. 5 and 6, the specific configuration of the exhaust gas outlet section of the turbine housing will be described.

As shown in FIG. 3, the inlet sleeve 210 is disposed along an inlet inner wall surface 117 (inner wall surface) of the inlet section 110 of the housing body 100. The inlet sleeve 210 is disposed so as to extend from an opening end 113 of the inlet section 110 of the housing body 100 to the vicinity of the inlet of the scroll flow passage 91, so as to impair direct contact between exhaust gas and the inlet inner wall surface 117 of the housing body 100.

Further, the inlet sleeve 210 is divided into two sections along the flow direction of exhaust gas, and includes an inlet-sleeve first section 210a and an inlet-sleeve second section 210b. Thus, upon production of the inlet sleeve 210, the inlet sleeve 210 can be machined separately as the inlet-sleeve first section 210a and the inlet-sleeve second section 210b.

Further, in some embodiments, the inlet sleeve 210 may be divided into three or more sections along the flow direction of exhaust gas. Further, in addition to being divided into a plurality of sections along the flow direction of exhaust gas, each section of the inlet sleeve 210 may be divided further along a direction that interests with the flow direction of exhaust gas.

Next, the support structure of the inlet sleeve 210 with respect to the inlet section 110 of the housing body 100 will be described.

The inlet section 110 of the housing body 100 includes an inlet concave portion 115 (concave portion) disposed along the peripheral edge of the opening end 113 of the inlet flow passage 111 of exhaust gas.

Furthermore, the inlet sleeve 210 includes an inlet convex portion (convex portion) 217 disposed so as to project outward in the radial direction of the inlet sleeve 210, on an upstream end portion 211 of the inlet sleeve 210 with respect to the flow direction of exhaust gas. Further, the inlet convex portion 217 is engaged with the inlet concave portion 115 of the housing body 100.

The inlet sleeve 210 is supported on the inlet section 110 of the housing body 100, such that a gap 501 is formed between the outer surface 215 of the inlet sleeve 210 and the inner wall surface 117 of the inlet section 110 of the housing body 100.

Specifically, the inlet sleeve 210 includes a protruding portion 219 disposed protruding from the outer surface 215 of the inlet sleeve 210, in a region between the upstream end portion 211 and the downstream end portion 213 of the inlet sleeve 210, with respect to the flow direction of exhaust gas. The protruding portion 219 is disposed so as to form the gap 501 between the inlet inner wall surface 117 of the housing body 100 and the outer surface 215 of the inlet sleeve 210.

In the present embodiment, the protruding portion 219 is formed by a dimple disposed so as to be recessed from the inner surface toward the outer surface 215 of the inlet sleeve 210, and a plurality of such protruding portions (dimples) 219 are disposed at intervals along the circumferential direction of the inlet sleeve 210. Further, in the present embodiment, the plurality of protruding portions 219 are disposed spaced from one another in the flow direction of exhaust gas of the inlet sleeve 210.

Nevertheless, in some embodiments, the protruding portion 219 is not limited to a dimple. For instance, the protruding portion 219 may be an annular protruding portion disposed continuously in the circumferential direction of the inlet sleeve 210. Further, in some embodiments of the present invention, only one protruding portion 219 may be disposed in the flow direction of exhaust gas of the inlet sleeve 210.

Further, in some embodiments of the present invention, the protruding portion 219 may not necessarily be provided, in the following case for instance. That is, if it is possible to form the gap 501 merely by engagement of the inlet convex portion 217 of the inlet sleeve 210 with the inlet concave portion 115 of the housing body 100, the protruding portion 219 may be omitted.

In some embodiments, a modified example described below may be applied to the exhaust gas inlet section of the turbine housing.

As shown in FIGS. 4A and 4B, the turbine housing 9 of the present modified example further includes a fixation piece 300 for fixing the inlet sleeve 210 to the inlet section 110 of the housing body 100. In the present modified example, the fixation piece 300 is an annular member, and is engaged with the inlet concave portion 115 of the housing body 100. Further, the inlet convex portion 217 of the inlet sleeve 210 is held between the fixation piece 300 and the housing body 100, while being engaged with the inlet concave portion 115 of the housing body 100.

In some embodiments, the fixation piece 300 may be fixed to the inlet concave portion 115 of the housing body 100 by welding.

According to the present modified example, the inlet convex portion 217 of the inlet sleeve 210 is held between the fixation piece 300 and the housing body 100 while being engaged with the inlet concave portion 115 of the housing body 100, and thus the inlet sleeve 210 can be firmly fixed to the housing body 100.

In some cases, it is preferable to fix the inlet sleeve 210 to the housing body 100 securely by welding. However, since the inlet sleeve 210 has a small thickness, heat generated from welding may cause deformation of the inlet sleeve 210.

According to the present modified example, the fixation piece 300 is provided, and thus it is possible to fix the fixation piece 300 to the housing body 100 by welding, and hold the inlet convex portion 217 of the inlet sleeve 210 between the fixation piece 300 and the housing body 100. Accordingly, it is possible to fix the inlet sleeve 210 to the housing body 100 more securely.

Next, with reference to FIG. 5, the exhaust gas outlet section of the turbine housing 9 according to some embodiments of the present invention will be described.

The outlet sleeve 220 is disposed along an outlet inner wall surface 127 of the outlet section 120 of the housing body 100. The outlet sleeve 220 is disposed so as to extend from an opening end 123 of the outlet section 120 of the housing body 100 to the vicinity of a waste gate valve 250 of the outlet section 120 of the housing body 100, so as to impair direct contact between exhaust gas and the outlet inner wall surface 127 of the housing body 100.

Further, in some embodiments, the outlet sleeve 220 may be provided for the turbine housing of a turbocharger that does not include the waste gate valve 250 (e.g. VG turbo).

Further, the outlet sleeve 220 is divided into two sections along the flow direction of exhaust gas, and includes an outlet-sleeve first section 220a and an outlet-sleeve second section 220b. Thus, upon production of the outlet sleeve 220, the outlet sleeve 220 can be machined separately as the outlet-sleeve first section 220a and the outlet-sleeve second section 220b.

Further, in some embodiments of the present invention, the outlet sleeve 220 may be divided into three or more sections along the flow direction of exhaust gas. Further, in addition to being divided into a plurality of sections along the flow direction of exhaust gas, each section of the outlet sleeve 220 may be divided further along a direction that intersects with the flow direction of exhaust gas.

Next, the support structure of the outlet sleeve 220 with respect to the outlet section 120 of the housing body 100 will be described.

The outlet section 120 of the housing body 100 includes an outlet concave portion 125 (concave portion) disposed along the peripheral edge of the opening end 123 of the outlet flow passage 121 of exhaust gas.

Furthermore, the outlet sleeve 220 includes an outlet convex portion (convex portion) 227 disposed so as to project outward in the radial direction of the outlet sleeve 220, on a downstream end portion 221 of the outlet sleeve 220 with respect to the flow direction of exhaust gas. Further, the outlet convex portion 227 is engaged with the outlet concave portion 125 of the housing body 100.

Further, in the present embodiment, as shown in FIG. 5B, the outlet concave portion 125 of the housing body 100 has a continuous annular shape along the circumferential direction of the outlet section 120 of the housing body 100.

Furthermore, the outlet sleeve 220 may include a plurality of outlet convex portions 227 disposed at intervals along the circumferential direction of the outlet sleeve 220. In this way, it is possible to reduce the contact area between the outlet sleeve 220 and the housing body 100 compared to a case where the outlet sleeve 220 has an outlet convex portion having a continuous annular shape along the circumferential direction. Accordingly, heat input from exhaust gas to the turbine housing 9 is reduced.

In some embodiments, the outlet sleeve may include an outlet convex portion 227 having a continuous annular shape in the circumferential direction. In this way, it is possible to fix the outlet sleeve 220 to the housing body 100 securely compared to a case in which the outlet sleeve 220 includes a plurality of outlet convex portions disposed spaced from one another along the circumferential direction.

Further, in some embodiments, as in the modified example of the exhaust gas inlet section of the turbine housing 9 shown in FIG. 4, a fixation piece for fixing the outlet sleeve 220 to the outlet section 120 of the housing body 100 may be further provided. In this case, the fixation piece is an annular member, for instance, and is engaged with the outlet concave portion 125 of the housing body 100. Further, the outlet convex portion 227 of the outlet sleeve 220 is held between the fixation piece and the housing body 100, while being engaged with the outlet concave portion 125 of the housing body 100.

In this case, in some embodiments, the fixation piece may be fixed to the outlet concave portion 125 of the housing body 100 by welding.

The outlet section 120 of the housing body 100 includes a fitting groove 129 configured to be engaged with an upstream end portion 223 (turbine-wheel side end portion) of exhaust gas of the outlet sleeve 220. The upstream end portion 223 of the outlet sleeve 220 with respect to the flow direction of exhaust gas is engaged with the fitting groove 129.

Further, in some embodiments, the fitting groove 129 may not necessarily be provided, in the following case for instance. That is, if the length of the outlet flow passage 121 of the outlet section of the housing body 100 and the length of the outlet sleeve 220 are both short, and if the position of the outlet sleeve 220 can be determined relative to the housing body 100 merely by engagement of the outlet convex portion 227 of the outlet sleeve 220 with the outlet concave portion 125 of the housing body 100, the fitting groove 129 of the outlet section 120 of the housing body 100 may be omitted.

The outlet sleeve 220 is supported on the outlet section 120 of the housing body 100, such that the gap 501 is formed between the outer surface 225 of the outlet sleeve 220 and the outlet inner wall surface 127 of the housing body 100.

Specifically, with the outlet convex portion 227 of the outlet sleeve 220 being engaged with the outlet concave portion 125 of the housing body 100 and the exhaust gas upstream end portion 223 of the outlet sleeve 220 being engaged with the fitting groove 129 of the housing body 100, the outlet sleeve 220 is supported on the outlet section 120 of the housing body 100 while forming the gap 501 between the outer surface 255 of the outlet sleeve 220 and the inner wall surface 127 of the outlet section 120 of the housing body 100.

In some embodiments, like the exhaust gas inlet section of the turbine housing 9 shown in FIG. 3, a protruding portion may be disposed protruding from the outer surface 225 of the outlet sleeve 220, in a region between the upstream end portion 223 and the downstream end portion 221 of the outlet sleeve 220, with respect to the flow direction of exhaust gas. The protruding portion may be disposed so as to form the gap 501 between the inlet inner wall surface 117 of the housing body 100 and the outer surface 215 of the inlet sleeve 210. In this case, the fitting groove 129 of the housing body 100 may be omitted.

Further, in some embodiments, similarly to the inlet section 110 of the housing body 100, the protruding portion may be formed by a dimple disposed so as to be recessed from the inner surface toward the outer surface 225 of the outlet sleeve 220.

In some embodiments, a modified example described below may be applied to the exhaust gas outlet section of the turbine housing.

As shown in FIGS. 6A and 6B, the turbine housing 9 of the present modified example further includes a fastening member 233 for fastening the exhaust gas upstream end portion 223 of the outlet sleeve 220 (turbine-wheel side end portion) to the outlet section 120 of the housing body 100. In the present modified example, the fastening member 233 may include, for instance, a plurality of bolts and a collar through which the bolts are to be inserted. Further, while the upstream end portion 223 of the outlet sleeve 220 with respect to exhaust gas is inserted onto the bolts and is held between the heads of the bolts and the collar, the bolts are screwed to the outlet section 120 of the housing body 100, and thereby the outlet sleeve 220 is fastened and supported by the turbine housing 9.

In a case where the upstream end portion 223 of the outlet sleeve 220 and the outlet section 120 of the housing body 100 are fastened directly without using the collar, the upstream end portion 223 of the outlet sleeve 220 may separate partially from the outlet section 120 of the housing body 100, and exhaust gas may enter the gap 501. In this regard, with the collar interposed between the upstream end portion 223 of the outlet sleeve 220 and the outlet section 120 of the housing body 100, the collar can block a flow of exhaust gas that enters the gap 501 via the fastening portion between the upstream end portion 223 of the outlet sleeve 220 and the outlet section 120 of the housing body 100.

Alternatively, in another embodiment, the upstream end portion 223 of the outlet sleeve 220 and the outlet section 120 of the housing body 100 may be directly fastened with the fastening member 233.

With reference to FIGS. 5 and 6, a configuration example of the exhaust gas outlet section of the turbine housing 9 has been described. In some embodiments, the configuration of the exhaust gas outlet section of the turbine housing 9 may be applied to the exhaust gas inlet section of the turbine housing 9.

For instance, in some embodiments, a plurality of inlet convex portions 217 of the inlet sleeve 210 disposed on the inlet section 110 of the housing body 100 may be disposed at intervals along the circumferential direction of the inlet sleeve 210. In this way, it is possible to reduce the contact area between the inlet sleeve 210 and the housing body 100 compared to a case in which the inlet convex portion 217 of the inlet sleeve 210 has a continuous annular shape along the circumferential direction. As a result, heat input from exhaust gas to the turbine housing 9 is reduced.

Further, for instance, in some embodiments, the inlet section 110 of the housing body 100 includes a fitting groove configured to be engaged with the downstream end portion 213 (turbine-wheel side end portion) the inlet sleeve 210 with respect to the flow direction of exhaust gas, and the downstream end portion 213 of the inlet sleeve 210 with respect to exhaust gas may be engaged with the fitting groove.

Further, for instance, in some embodiments, the turbine housing 9 may further include a fastening member for fastening the exhaust gas downstream end portion 213 of the inlet sleeve 210 (turbine-wheel side end portion) to the inlet section 110 of the housing body 100. The fastening member may include, for instance, a plurality of bolts and a collar through which the bolts are to be inserted. In this case, while the downstream end portion 213 of the inlet sleeve 210 with respect to exhaust gas is inserted onto the bolts and is held between the heads of the bolts and the collar, the bolts are screwed to the outlet section 120 of the housing body 100, and thereby the inlet sleeve 210 is fastened and supported by the turbine housing 9.

Figure 7:
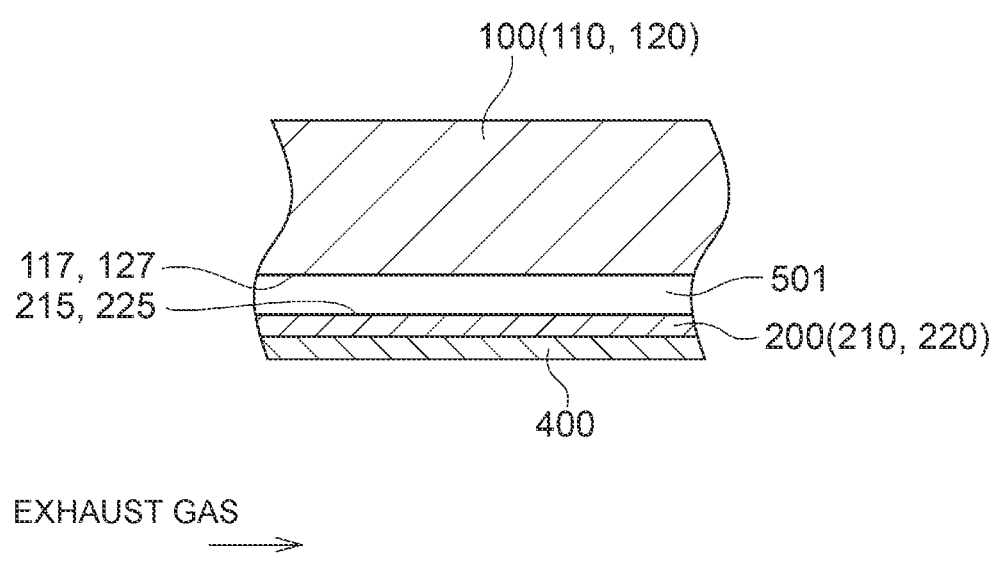
FIG. 7 is a diagram of an example of a heat shield structure of a turbine housing according to some embodiments of the present invention.

Next, with reference to FIG. 7, an example of a heat shield structure of a turbine housing according to some embodiments of the present invention will be described. FIG. 7 is a diagram of an example of a heat shield structure of a turbine housing according to some embodiments of the present invention.

As shown in FIG. 7, in some embodiments, the turbine housing 9 includes a thermal barrier coating 400 on the inner surface of the sleeve (210, 220). The thermal barrier coating 400 can be, for instance, formed by the spraying.

That is, according to the present embodiment, the gap 501 is formed between the inner wall surface (117, 127) of the housing body 100 and the sleeve (210, 220), and the thermal barrier coating 400 is formed on the inner surface of the sleeve (210, 220). Further, the three layers including the gap 501, the sleeve (210, 220), and the thermal barrier coating 400 separate the exhaust gas flow passage from the inner wall surface of the housing body 100.

With the thermal barrier coating 400, it is possible to block entry of heat into the sleeve (inlet sleeve 210, outlet sleeve 220) from exhaust gas, at the inlet section 110 and the outlet section 120 of the housing body 100, and thereby it is possible to further reduce heat input from exhaust gas to the turbine housing 9.

Further, the inlet sleeve 210 and the outlet sleeve 220 are each divided into two sections along the flow direction of exhaust gas. Thus, in a case where the thermal barrier coating 400 is formed by spraying, for instance, it is possible to form the thermal barrier coating 400 easily compared to a cylindrical sleeve having an integrated structure.

Figure 8:
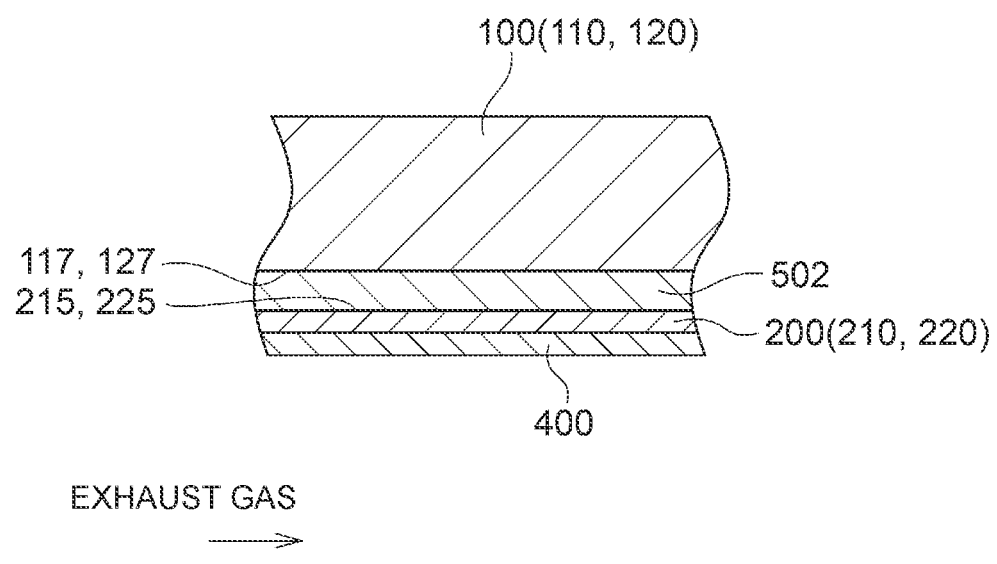
FIG. 8 is a diagram showing a modified example of a heat shield structure of a turbine housing according to some embodiments of the present invention.

Next, with reference to FIG. 8, a modified example of a heat shield structure of a turbine housing according to some embodiments of the present invention will be described. FIG. 8 is a diagram showing a modified example of a heat shield structure of a turbine housing according to some embodiments of the present invention.

As shown in FIG. 8, in some embodiments, the turbine housing 9 includes a heat insulating member 502 disposed between the inlet inner wall surface 117 of the inlet section 110 of the housing body 100 and the outer surface 215 of the inlet sleeve 210. Further, the turbine housing 9 includes a heat insulating member 502 disposed between the outlet inner wall surface 127 of the outlet section 120 of the housing body 100 and the outer surface 225 of the outlet sleeve 220.

With the heat insulating member 502, it is possible to reduce the quantity of heat transmitted to the turbine housing 9 from the sleeve (210, 220), at the inlet section 110 and the outlet section 120 of the housing body 100, and thereby it is possible to further reduce heat input from exhaust gas to the turbine housing 9.

Further, while the thermal barrier coating 400 of the present modified example is formed on the inner surface of the sleeve (210, 220), this is not limitative, and the thermal barrier coating 400 may be omitted in some embodiments.

According to some embodiments described above, the sleeve (210, 220) is disposed along the inner wall surface (117, 127) of the inlet section 110 and the outlet section 120 of the housing body 100, and thus it is possible to prevent contact between exhaust gas and the inner wall surface (117, 127) of the housing body 100 having a high heat capacity. Thus, it is possible to suppress heat input to the housing body 100 from exhaust gas, and to suppress loss of thermal energy of exhaust gas.

Accordingly, in a case where the catalyst 5 is disposed on the downstream side of the exhaust turbine 7 with respect to the flow direction of exhaust gas, it is possible to maintain a high temperature of exhaust gas discharged from the exhaust turbine 7. Thus, when the turbocharger 1 is to be started, it is possible to shorten the time it takes to activate the catalyst 5.

Further, with the inlet sleeve 210 preventing contact between exhaust gas and the inner wall surface of the housing body 100 having a high heat capacity, it is possible to cause exhaust gas having a greater amount of thermal energy to flow into the turbine wheel 11. Accordingly, exhaust gas performs more work on the turbine wheel 11 upon start of the engine, and thus it is possible to improve response of the turbocharger 1.

Further, the temperature of exhaust gas flowing through the turbine scroll flow passage 91 may decrease due to heat transmission from the inlet scroll portion (turbine scroll flow passage 91) of the turbine housing 9 to the outlet diffuser portion (outlet flow passage 121) via the housing body 100. In this regard, with the outlet sleeve 220 having the above configuration, it is possible to suppress heat transmission to the outlet diffuser portion from inlet scroll portion, and thereby it is possible to improve response of the turbocharger 1.

Further, according to the above embodiment, the sleeve (210, 220) includes a plurality of sections divided along the flow direction of exhaust gas, and thus it merely needs to machine the sleeve (210, 220) by sections to produce the sleeve (210, 220), and the manufacturability is improved compared to a turbine housing 9 that includes a sleeve having an integrated structure.

Further, according to the above embodiment, the concave portion (115, 125) of the housing body 100 is engaged with the convex portion (217, 227) disposed projecting outward in the radial direction of the sleeve (210, 220), and thus it is possible to determine the position of the sleeve (210, 220) relative to the housing body 100. In this way, it is possible to assemble the sleeve (210, 220) with the housing body 100 easily, and the manufacturability of the turbine housing 9 is improved.

Further, according to the above embodiment, the sleeve (210, 220) is supported on the housing body 100, such that the gap 501 is formed between the outer surface (215, 225) of the sleeve and the inner wall surface (117, 127) of the housing body 100. Thus, it is possible to suppress heat input to the turbine housing 9 from exhaust gas with the gap 501, and to suppress loss of thermal energy of exhaust gas.

Further, according to the above embodiment, the inlet sleeve 210 includes the protruding portion 219 disposed to protrude from the outer surface of the inlet sleeve 210, in a region between the upstream end portion 211 and the downstream end portion 213 of the inlet sleeve 210 with respect to exhaust gas, and the protruding portion 219 forms the gap 501 between the outer surface of the inlet sleeve 210 and the inlet inner wall surface 117 of the housing body 100. Thus, it is possible to maintain the gap 510 more reliably between the outer surface 215 of the inlet sleeve 210 and the inlet inner wall surface 117 of the housing body 100. Thus, it is possible to suppress heat input to the turbine housing 9 from exhaust gas, and to suppress loss of thermal energy of exhaust gas.

Further, in the above embodiment, the protruding portion 219 is formed by a dimple disposed so as to be recessed from the inner surface toward the outer surface of the inlet sleeve 210, and thus it is possible to from the protruding portion 219 simultaneously when machining the inlet sleeve 210 by pressing or the like, which improves the manufacturability of the turbine housing 9.

Further, according to the above embodiment, the outlet section 120 of the housing body 100 includes a fitting groove 129 configured to be engaged with the upstream end portion 223 (turbine-wheel side end portion) of the outlet sleeve 220 with respect to the flow direction of exhaust gas. Thus, with the upstream end portion 223 of the outlet sleeve 220 with respect to exhaust gas being engaged with the fitting groove 129, it is possible to determine the position of the outlet sleeve 220 relative to the housing body 100 accurately. Thus, it is possible to improve the manufacturability of the turbine housing 9.

Further, it is possible to maintain the gap 501 more reliably between the outer surface 225 of the outlet sleeve 220 and the outlet inner wall surface 127 of the housing body 100, and thus it is possible to suppress heat input to the turbine housing 9 from exhaust gas with the gap 501, and to suppress loss of thermal energy of exhaust gas even further.

DESCRIPTION OF REFERENCE NUMERALS

1 Turbocharger
3 Compressor
31 Compressor impeller
33 Compressor housing
35 Compressor scroll flow passage
39 Intake guide flow passage
41 Diffuser flow passage
5 Catalyst
7 Exhaust turbine
9 Turbine housing
91 Turbine scroll flow passage
11 Turbine wheel
100 Housing body
110 Inlet section
111 Inlet flow passage
113 Inlet opening end
115 Inlet concave portion
117 Inlet inner wall surface
120 Outlet section
121 Outlet flow passage
123 Outlet opening end
125 Outlet concave portion
127 Outlet inner wall surface
129 Fitting groove
210 Inlet sleeve
210a Inlet-sleeve first section
210b Inlet-sleeve second section
211 Upstream end portion of inlet sleeve
213 Downstream end portion of inlet sleeve (turbine-wheel side end portion)
215 Outer surface of inlet sleeve
217 Inlet convex portion
219 Protruding portion (dimple)
220 Outlet sleeve
220a Outlet-sleeve first section
220b Outlet-sleeve second section
221 Downstream end portion of outlet sleeve
223 Upstream end portion of outlet sleeve (turbine-wheel side end portion)
225 Outer surface of outlet sleeve
227 Outlet convex portion
233 Fastening member
250 Waste gate valve
300 Fixation piece
400 Thermal barrier coating
501 Gap
502 Heat insulating member

The invention claimed is:

1. A turbine housing, comprising:
a housing body which is configured to accommodate a turbine wheel and which includes a scroll flow passage disposed around the turbine wheel, an inlet section forming an inlet flow passage for guiding exhaust gas to the scroll flow passage, and an outlet section forming an outlet flow passage for discharging the exhaust gas from the turbine wheel; and
a sleeve disposed along an inner wall surface of the inlet section of the housing body,
wherein the sleeve includes a plurality of sections divided along a flow direction of the exhaust gas,
wherein the inlet passage has a curved shape between an upstream end of the inlet passage and a downstream end of the inlet passage connected to the scroll passage,
wherein the plurality of sections includes:
a first section disposed on an inner side of the curved shape; and
a second section disposed on an outer side of the curved shape,
wherein a division line between the first section and the second section extends in a curved manner along the flow direction of the exhaust gas in the inlet passage having the curved shape.

2. The turbine housing according to claim 1,
wherein the housing body includes a concave portion disposed along a peripheral edge of an opening end of a flow passage of the exhaust gas of the inlet section of the housing body, and
wherein the sleeve includes a convex portion disposed projecting outward in a radial direction of the sleeve so as to be engaged with the concave portion.

3. The turbine housing according to claim 2,
further comprising a fixation piece for fixing the sleeve on the housing body,
wherein the projecting portion of the sleeve is held between the fixation piece and the housing body while being engaged with the concave portion of the housing body.

4. The turbine housing according to claim 1,
wherein the sleeve is supported by the housing body such that a gap is formed between an outer surface of the sleeve and an inner wall surface of the housing body.

5. The turbine housing according to claim 1,
wherein the sleeve includes a protruding portion disposed protruding from an outer surface of the sleeve, in a region between an upstream end portion and a downstream end portion with respect to the exhaust gas, and
wherein the protruding portion is configured to form a gap between the outer surface of the sleeve and an inner wall surface of the housing body.

6. The turbine housing according to claim 5,
wherein the protruding portion is formed by a dimple disposed so as to be recessed toward the outer surface from an inner surface of the sleeve.

7. The turbine housing according to claim 1,
further comprising a thermal barrier coating on an inner surface of the sleeve.

8. The turbine housing according to claim 1,
further comprising a heat insulating material disposed between the sleeve and an inner wall surface of the inlet section of the housing body.

9. An exhaust turbine, comprising:
the turbine housing according to claim 1; and
a turbine wheel to be accommodated in the turbine housing.

10. A turbocharger, comprising:
the exhaust turbine according to claim 9; and
a compressor configured to be driven by the exhaust turbine.

11. A turbine housing, comprising:
a housing body which is configured to accommodate a turbine wheel and which includes an inlet section forming an inlet flow passage for guiding exhaust gas to the turbine wheel, and an outlet section forming an outlet flow passage for discharging the exhaust gas from the turbine wheel; and
a sleeve disposed along an inner wall surface of the outlet section of the housing body,
wherein the sleeve includes a plurality of sections divided along a flow direction of the exhaust gas,
wherein the outlet section of the housing body includes a fitting groove into which a turbine-wheel side end portion of the sleeve is engageable.

12. A turbine housing, comprising:
a housing body which is configured to accommodate a turbine wheel and which includes an inlet section forming an inlet flow passage for guiding exhaust gas to the turbine wheel, and an outlet section forming an outlet flow passage for discharging the exhaust gas from the turbine wheel; and
a sleeve disposed along an inner wall surface of the outlet section of the housing body,
wherein the sleeve includes a plurality of sections divided along a flow direction of the exhaust gas,
wherein the turbine housing further comprises a fastening member for fastening a turbine-wheel side end portion of the sleeve to the outlet section of the housing body.

* * * * *